(12) United States Patent  (10) Patent No.: US 6,293,387 B1
Forster  (45) Date of Patent: Sep. 25, 2001

(54) CARRIER, CARRIER ORIENTATION AND CONVEYING STRUCTURE, CARRIER LINE SYSTEM ASSEMBLY, AND CARRIER PROCESS

(76) Inventor: Hugh H. Forster, 737 Colby Ct., Gurnee, IL (US) 60031

( * ) Notice: Subject to any disclaimer, the term of this patent is extended or adjusted under 35 U.S.C. 154(b) by 0 days.

(21) Appl. No.: 09/506,218

(22) Filed: Feb. 17, 2000

(51) Int. Cl.[7] .................................................. B65G 47/24
(52) U.S. Cl. ................................ 198/377.02; 198/465.2; 198/795
(58) Field of Search ........................... 198/377.02, 465.2, 198/795

(56) References Cited

U.S. PATENT DOCUMENTS

| | | |
|---|---|---|
| D. 412,769 | 8/1999 | Petrovic . |
| 2,642,212 * | 6/1953 | Currivan ........................ 198/377.02 |
| 3,981,392 * | 9/1976 | Booz et al. ..................... 198/377.02 |
| 4,142,706 | 3/1979 | Mueller . |
| 4,168,775 * | 9/1979 | Mueller ................................ 198/795 |
| 4,305,496 | 12/1981 | Hoppmann et al. . |
| 4,664,248 | 5/1987 | Goodman, Jr. et al. . |
| 4,723,661 | 2/1988 | Hoppmann et al. . |
| 5,484,052 | 1/1996 | Pawloski et al. . |
| 5,579,695 | 12/1996 | Cockayne . |
| 5,853,077 | 12/1998 | Schmitt . |

* cited by examiner

*Primary Examiner*—Joseph E. Valenza
(74) *Attorney, Agent, or Firm*—James P. Hanrath

(57) ABSTRACT

A carrier for orienting and conveying things to be transported includes a body having a top surface, a bottom surface, a first side periphery, and a second side periphery. The bottom surface is intersected by a traverse slot which is upwardly communicative with a traverse through bore. Either of the first side periphery or the top surface provides a transport section adapted to receive and convey the thing to be transported, and the second side periphery provides a drive control section suited to engage a drive mechanism. The body may include a hold lip, detent, or other structure cooperative with the first side periphery or top surface to contact, receive, and convey the thing to be transported. The carrier is used in an assembly carrier line system which includes structure for driving the carriers along a desired pathway wherein the pathway has a guide element cooperative with the carrier selected from one or more of the group consisting of a rail for engagement into the traverse slot of the carrier, a rod for engagement into the traverse bore of the carrier, and a boundary barrier to contain the carriers. When the guide element of the pathway includes a cam rail surface upon the rod, selected controlled rotational movement of the carrier circumferentially upon the rod perpendicular to its ongoing lineal path along at least a portion of the length of the rod is achieved.

31 Claims, 11 Drawing Sheets

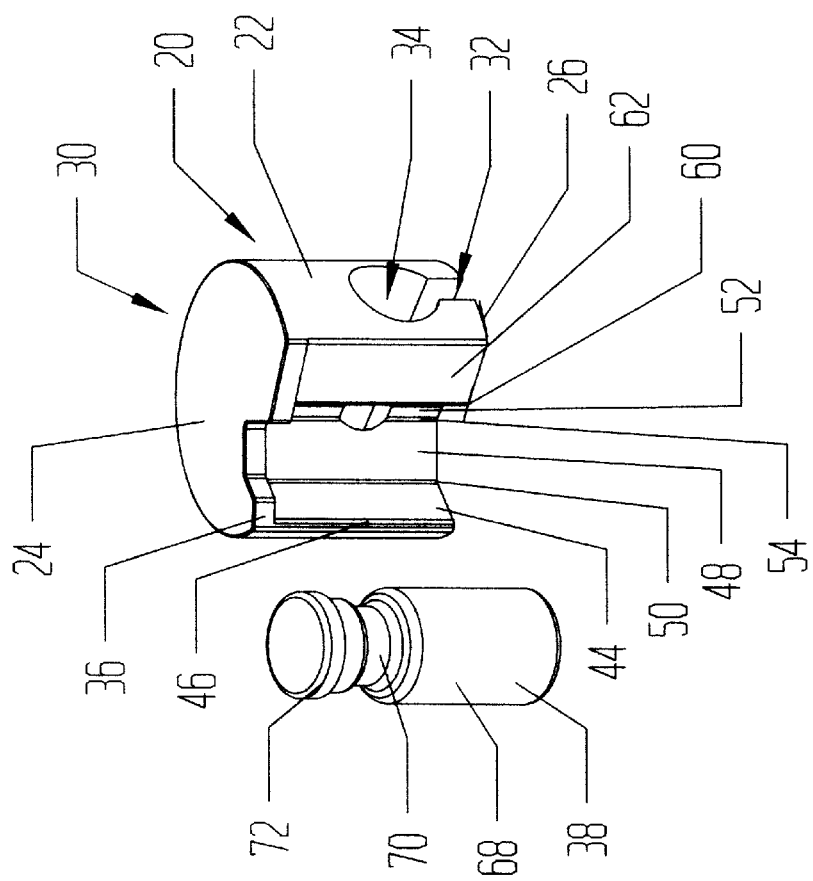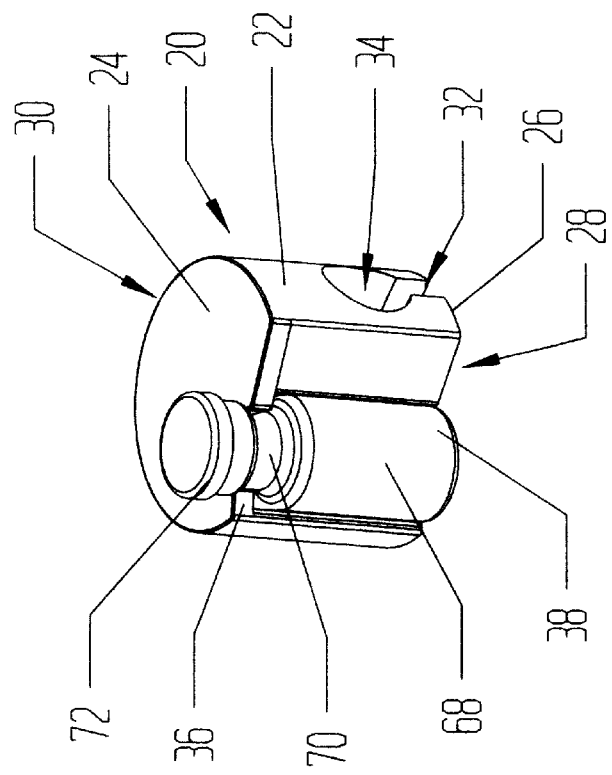

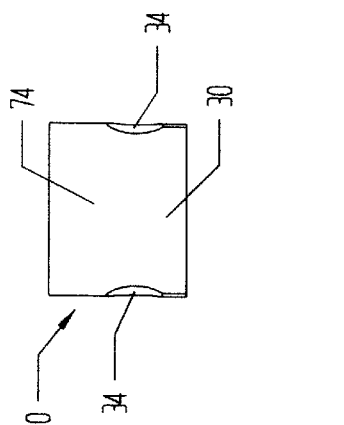
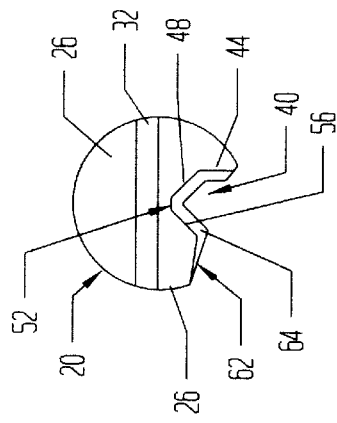
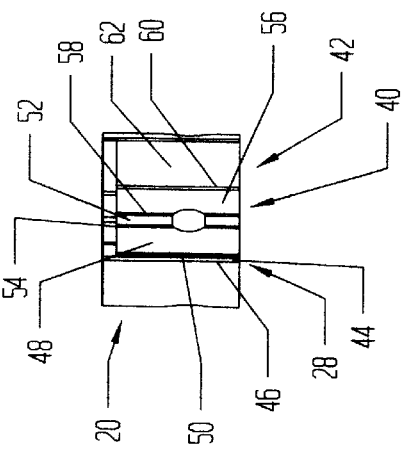
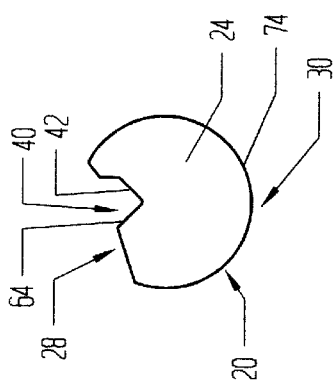
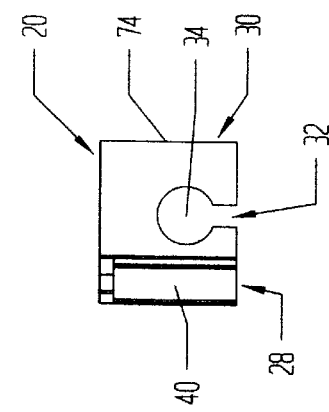
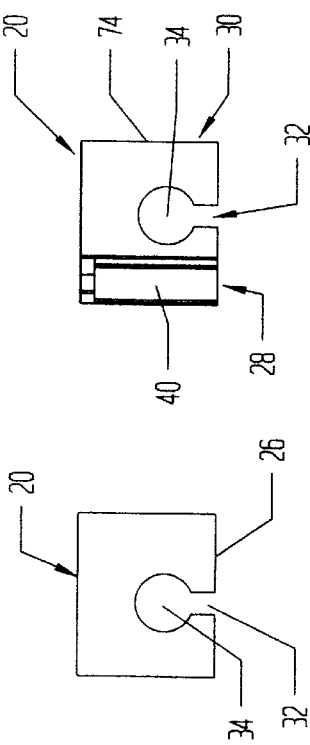

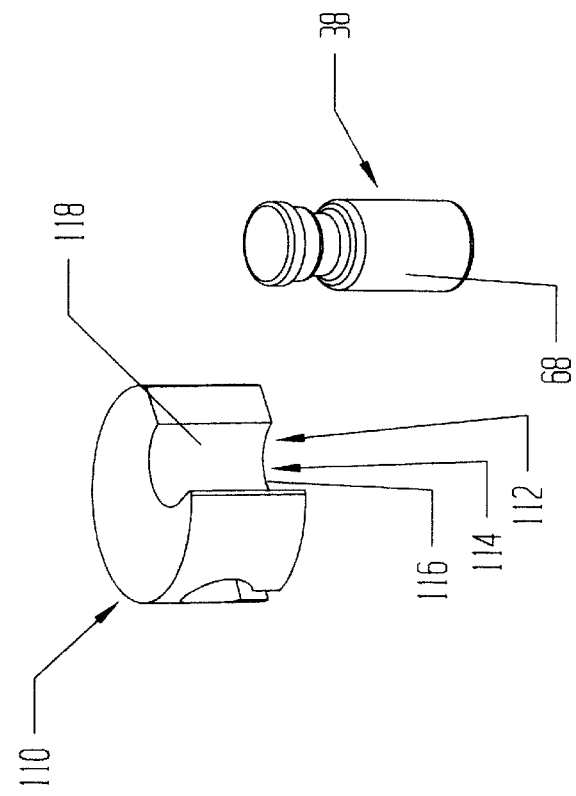
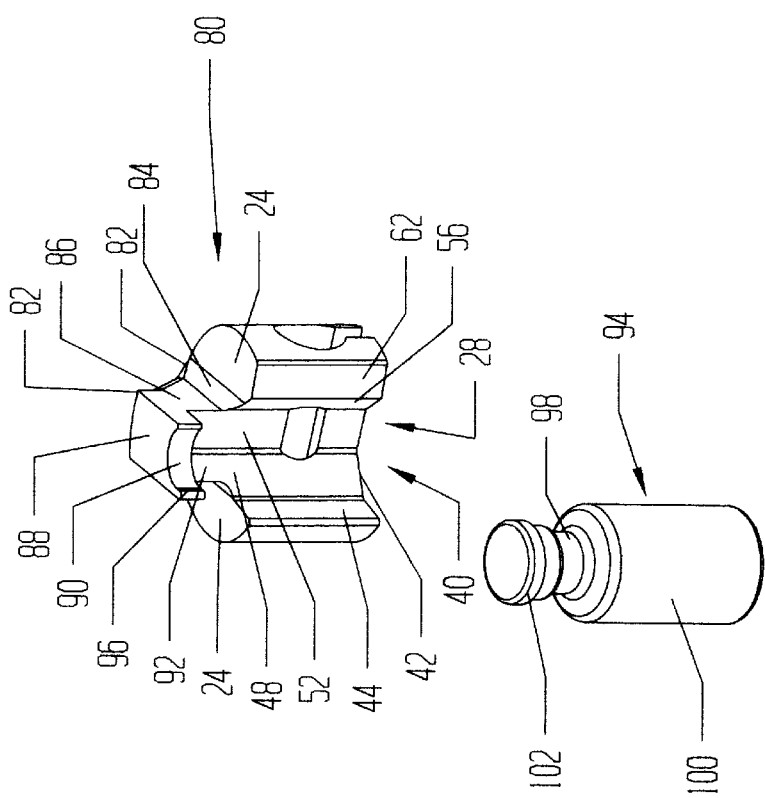
FIG. 11
FIG. 10

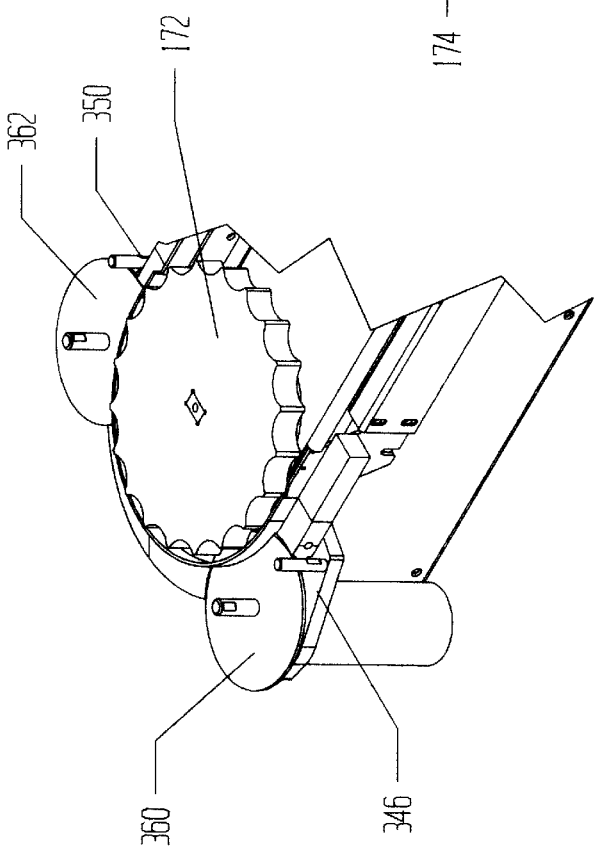
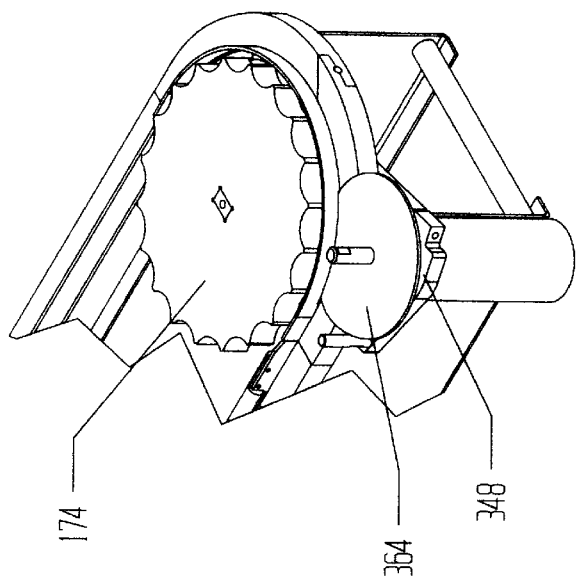

CARRIER, CARRIER ORIENTATION AND CONVEYING STRUCTURE, CARRIER LINE SYSTEM ASSEMBLY, AND CARRIER PROCESS

BACKGROUND OF THE INVENTION

1. Field of the Invention

The present invention relates generally to assembly carrier line systems, particularly to controlled carrier means and methods for carrying and orienting products or workpieces in a desired line of travel for machine or station processing.

2. Description of the Related Art

In some prior art assembly line systems, workpieces are carried on carriers, commonly pallets or pucks, that run along an assembly line in frictional engagement with an underlying support conveyor means usually the form of a rubber belt or cardanic chain. The use of pallets or pucks of various shapes for conveying discrete products has been in practice for some time. Such carriers increase product design flexibility, since the product design is not be limited by a need for the particular good to be provided with product conveying and orienting characteristics such as pins provided on the product, a flat formed on the product, or a peripheral seam of the product. Such carriers thus enable the conveying of products which are odd shaped, fragile, or which lack stability while also eliminating shingling (vertical or horizontal overlapping of products), squirting (vertical displacement due to product-to-product contact), scuffing, denting, breakage, and jams during assembly line conveying procedure.

Particularly in assembly carrier line operations wherein the carriers are not required to accommodate a variety of specific product orientations, one or more machine stations are employed parallel to the carriers to perform defined systematic operations upon the product. Such operations typically have several disadvantages including the serial line thru-put of carriers being subject to random product surging or accumulation, and the rate of carrier serial line thru-put being a function of the slowest machine or station in the line. Still further, the machine or station operations are usually limited to the initial product orientation set early in the line procedure which is maintained throughout the line. A need therefore exists for rapid repetitive assembly line processing of carrier borne products or workpieces to accommodate multiple machine or station operations which require differing specific orientations of the product or workpieces at selected points of the overall assembly line processing procedure.

An attempt to address this need can be found in U.S. Pat. No. 4,664,248 which discloses a device and method for specifically orienting and conveying products and in a common direction of travel that employs a plurality of identical, circular, product-carrying pucks having a flat conveyor contacting bottom surface and at least one circular peripheral surface contactable by corresponding circular peripheral surfaces of other pucks when located in a random surge thereof. Each puck is surmounted by a product support. Between its bottom surface and its product support, each puck has a peripheral slide surface parallel to the desired direction of travel of the oriented puck and at least one peripheral rotation producing surface, the slide and peripheral producing surfaces being inset from the circular peripheral surface. A conveyor is provided having in association therewith at least one external contact surface to engage the rotation producing surface of each puck and an alignment rail having an alignment edge to contact the slide surface of each puck. Each puck is conveyed past the at least one contact surface which cooperates with the at least one rotation producing surface to cause rotation of the puck until the alignment edge of the alignment rail contacts the puck slide surface to stop rotation of the puck in the desired orientation and to maintain this orientation of the puck as it is conveyed to the next workstation. However, the piece-part manipulation of product or workpieces of this carrier line operation is based upon the linear motion and rotational motion of the carrier parallel to the direction of carrier travel, not perpendicular to the linear direction of travel. Such a system does not expose both a side surface and bottom surface of the thing to be transported to workstations or other assembly line system processing.

SUMMARY OF THE INVENTION

In accordance with the present invention there is provided a carrier for orienting and conveying things to be transported comprising a body having a top surface, a bottom surface, a first side periphery, a second side periphery, a traverse slot, and a traverse through bore, the bottom surface being intersected by said traverse slot, the traverse slot being upwardly communicative with the traverse through bore, either of the first side periphery or the top surface providing a transport section adapted to receive and convey the thing to be transported, and the second side periphery providing a drive control section suited to engage a drive mechanism.

In a second embodiment of the invention, structure for specifically orienting and conveying things in a desired direction of travel is disclosed which includes a carrier for orienting and conveying things to be transported, a pathway having a guide element cooperative with the carrier and in part allowing for linear motion of the carrier, and a drive mechanism for moving the carrier along the pathway, the carrier comprising a body having a top surface, a bottom surface, a first side periphery, a second side periphery, a traverse slot, and a traverse through bore, the bottom surface being intersected by said traverse slot, the traverse slot being upwardly communicative with the traverse through bore, either of the first side periphery or the top surface providing a transport section adapted to receive and convey the thing to be transported, and the second side periphery providing a drive control section suited to engage the drive mechanism, the pathway guide element being selected from one or more of the group consisting of a rail for engagement into the traverse slot of the carrier, and a rod for engagement into the traverse through bore of the carrier, and a boundary barrier to contain the carrier.

In a further embodiment of the present invention there is disclosed an assembly carrier line system in which carriers are conveyed in a desired direction of travel, in use, along an assembly line to work stations in order to perform work operations on things merged with the carriers which includes a pathway, a drive mechanism, a plurality of carriers, each of the carriers being a body having a top surface, a bottom surface, a first side periphery, a second side periphery, a traverse slot, and a traverse through bore, the bottom surface being intersected by said traverse slot, the traverse slot being upwardly communicative with the traverse through bore, either of the first side periphery or the top surface providing a transport section adapted to receive and convey the thing to be transported, and the second side periphery providing a drive control section, a sprocket mechanism responsive to the drive mechanism and cooperative with the drive control section of the carriers to cause movement of the carriers upon the pathway, the pathway guide element being selected from one or more of the group consisting of a rail for engagement into the traverse slot of the carriers, a rod for engagement into the traverse through bore of the carriers, and a boundary barrier to contain the carriers.

Still further, the present invention provides for a process of specifically orienting and conveying things in a desired direction of travel, that includes the steps of providing a plurality of carriers upon an assembly line pathway, each of the carriers comprising a body having a top surface, a bottom surface, a first side periphery, a second side periphery, a traverse slot, and a traverse through bore, the bottom surface being intersected by said traverse slot, the traverse slot being upwardly communicative with the traverse through bore, either of the first side periphery or the top surface providing a transport section adapted to receive and convey the thing to be transported, and the second side periphery providing a drive control section suited to engage a sprocket mechanism operatively connected to a drive mechanism, and moving the carriers along the pathway by means of the sprocket mechanism operatively connected to the drive mechanism, the sprocket mechanism preferably having a plurality of teeth each being of a profile suited to receive a carrier therebetween, and the pathway having a guide element cooperative with the carriers and in part allowing linear motion of the carriers, the pathway guide element being selected from one or more of the group consisting of a rail for engagement into the traverse slot of the carriers, a rod for engagement into the traverse through bore of the carriers, and a boundary barrier to contain the carriers.

The present invention advantageously provides improved piece-part manipulation of product, things, or workpieces in a wide variety of carrier line operations by allowing for controlled precision positioning of an array of individual independent carriers both in linear motion and rotational motion along the carrier's horizontal axis circumferentially upon a rod extending through the traverse through bore of the carrier body (the rod having also a cam element to engage the traverse slot of the carrier body) in a direction perpendicular to the linear direction of travel along at least a portion of the rod. The rotational orientation of carriers of the present invention perpendicular to their linear pathway can expose distinct selected surfaces of the products or workpieces merged with the carrier, such as top, side, and bottom surfaces, for a wide variety of machine station processing in myriad assembly carrier line environments. Additional features and advantages of the present invention will become apparent to those skilled in the art from the following description and the accompanying figures illustrating preferred embodiments of the invention, the same being the present best mode for carrying out the invention.

BRIEF DESCRIPTION OF THE DRAWINGS

FIG. 2 is a perspective view of a preferred embodiment of the carrier of the present invention having a vial merged thereon.

FIG. 3 is a perspective view of the carrier of FIG. 2 with the vial laterally exploded therefrom.

FIG. 4 is a top view of the carrier of FIG. 2.

FIG. 5 is a bottom view of the carrier of FIG. 2.

FIG. 6 is a frontal face view of the carrier of FIG. 2 and shows a traverse slot thereof being upwardly communicative with a traverse through bore thereof.

FIG. 7 is a rear face view of the carrier of FIG. 2 and shows the carrier in a direction opposite of FIG. 6.

FIG. 8 is a side view of the carrier of FIG. 2 and shows a transport section thereof.

FIG. 9 is a side view of the carrier of FIG. 3 and shows a drive control section thereof.

FIG. 10 is a perspective view of another embodiment of the carrier of the present invention having a raised top portion cooperative with the carrier transport section to receive, support, and convey a vial laterally exploded therefrom.

FIG. 11 is a perspective view of still another embodiment of the carrier wherein the carrier transport section comprises an arcuate detent to receive and convey a vial laterally exploded therefrom.

FIG. 18 is a top perspective view of one of the end sprocket wheels of an assembly line system of FIG. 17 with carriers and feed and discharge assemblies removed and shows two spin disks for the feeding of things to and discharged of things from their carriers.

FIG. 19 is a top perspective view of the other of the end sprocket wheels of the assembly line system of FIG. 17 with carriers and rejection assembly removed and shows a spin disk for the rejection of things from their carriers.

DESCRIPTION OF THE PREFERRED EMBODIMENTS

Figure 1:
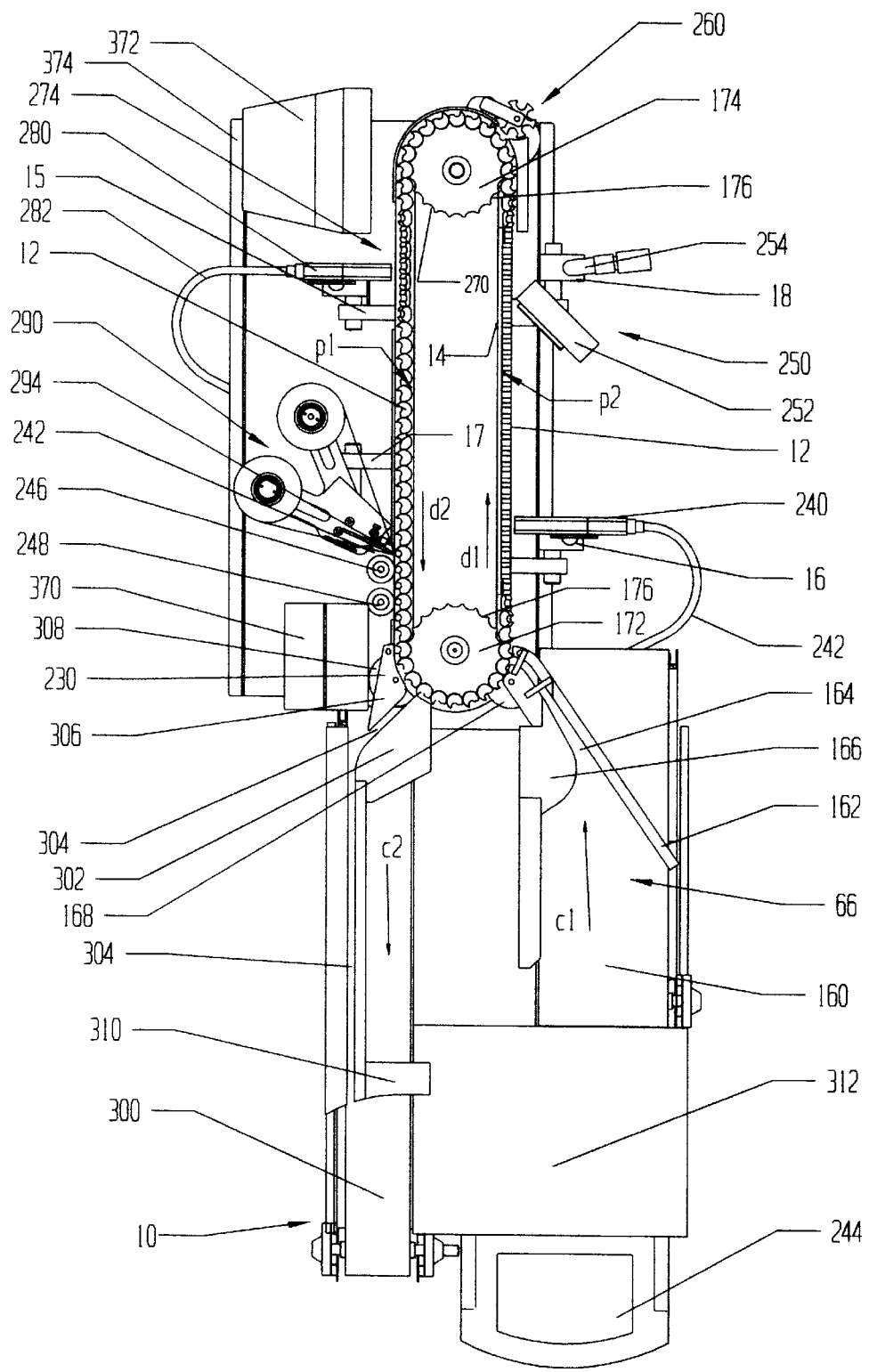
FIG. 1 is a top perspective schematic view of an assembly line system constructed in accordance with the present invention in which carriers are conveyed in a desired direction of travel, in use, along an assembly line to multiple workstations in order to perform work operations on things merged with the carriers.

Referring now to the drawings, there is shown in FIG. 1 an assembly carrier line system 10 in which a plurality of carriers 12 are conveyed in a desired direction of travel (d1,d2), in use, along an assembly carrier line 14 to work stations 16,18,15,17 in order to perform work operations on things merged with the carriers (such as products, things, or workpieces, for example vials, which for ease of illustration are not shown merged with the carriers 12 of FIG. 1).

The carriers 12 may be of various embodiments as illustrated in FIGS. 2 through 13. For example, in the perspective views of FIGS. 2 and 3, carrier 20 for orienting and conveying things to be transported comprises a body 22 having a top surface 24, a bottom surface 26, a first side periphery 28, a second side periphery 30, a traverse slot 32, a traverse through bore 34 and means 36 cooperative with the first side periphery 28 to contact, receive, and support the thing to be transported and merge the same with the carrier, namely vial 38 which in FIG. 2 is merged with carrier 20 and in FIG. 3 is laterally exploded from carrier 20.

As better observed in the bottom view of FIG. 5 and frontal face view of FIG. 6, bottom surface 26 is substantially planar and is intersected by a traverse slot 32. The traverse slot 32 is upwardly communicative with the traverse through bore 34. The traverse through bore 34 is substantially arcuate in cross-section and preferably extends substantially parallel to a desired direction of travel of the carrier 20 when the carrier is properly oriented in an assembly carrier line system.

FIG. 8 is a side view of carrier 20 showing the first side periphery 28 which defines and provides a transport section 40 adapted to receive and support a thing to be transported, such as vial 38. In this regard, detent 42 of first side periphery 28 includes four wall surfaces, namely a first wall surface 44 extending inwardly of periphery border 46, a second wall surface 48 extending inwardly and angularly from a first wall border 50 of the first wall surface 44, a third wall surface 52 extending at a substantially right angle from second wall border 54 of the second wall surface 48, and a fourth wall surface 56 extending outwardly and angularly from a third wall border 58 of the third wall surface 52 until terminating at a cut-off border 60 of cut-off wall 62. A notch hold lip 64 extends from top surface 24 of carrier 20 at least partially over the first wall surface 44, the second wall surface 48, the third wall surface 52, and the fourth wall surface 56 (see also the top view of FIG. 4 and the bottom view of FIG. 5). The detent 42 of first side periphery 28 thus defines and provides a transport section 40 adapted to receive and support a thing to be transported, for example vial 38. When periphery border 46 comes into contact with vial 38 feed from a feed assembly 66 (see FIG. 1), the vial contacts the notch hold lip 64 and is fed into detent 42 of the first side periphery 28 such that a body section 68 of vial 38 contacts and is received into the first wall surface, the second wall surface, the third wall surface, and the fourth wall surface while notch hold lip 64 partially encircles neck portion 70 of vial 38 to secure body section 68 of vial 38 below notch hold lip 64 and head section 72 of vial 38 above notch hold lip 64. Thus, the notch hold lip 64 is contoured to mate with and merge with the vial 38.

FIG. 9 is a side view of carrier 20 showing second side periphery 30 which serves as a drive control section 74 thereof. Drive control section 74 of second side periphery 30 also serves to define a profile and a constant partial mass of an individual carrier among the array of carriers for assembly carrier line purposes as hereinafter discussed.

Referring now to the rear view of FIG. 7, carrier 20 has its first side periphery 28 which defines and provides a transport section 40 spaced a given distance from and separate from the traverse slot 32. Likewise, the second side periphery 30 of carrier 20 which defines and provides a drive control section 74, is spaced a given distance from and separated from of traverse slot 32 at a portion of the carrier 20 opposite first side periphery 28. The FIG. 4 top view of carrier 20 further illustrates the relationship between first side periphery 28 and second side periphery 30 as well as the contour nature of notch hold lip 64.

FIG. 10 is a perspective view of another embodiment of a carrier according to the present invention. In FIG. 10, carrier 80 is in most respects identical to carrier 20 heretofore described in reference to FIGS. 2 through 9, thus for ease of description common structural features will be designated by common reference numbers. However, carrier 80 has a raised portion section 82 integral with and extending upwardly from top surface 24 which consist of a shoulder 84, a neck section 86 upon a shoulder 84, and a head section 88 having an arcuate hold lip 90 which extends into detent 42 and transport section 40 of first side periphery 28. An front surface 92 of shoulder 84 and neck section 86 thus represents, in part, an upward extension of the second wall surface 48, third wall surface 52, and fourth wall surface 56 to thereby raise arcuate hold lip 90 a further distance from top surface 24 of carrier 80 in order to accommodate a larger product or workpiece, such as vial 94, which is of a larger size than the vial 38 relative FIGS. 2 through 9, so that larger vial 94 can be received into the detent 42 and transport section 40 of first side periphery 28 of carrier 80. In this regard, when a vial 94 is feed from a feed assembly 66 (see FIG. 1), the vial contacts a first prong element 96 of arcuate hold lip 90 contacts a neck portion 98 of vial 94 while a body portion 100 of vial 94 contacts the various several wall surfaces of the detent 42 transport section 40 of the first side periphery 28 of carrier 80 so that the arcuate hold lip 90 of carrier 80 partially encircles neck portion 98 of vial 94 to secure body section 100 of vial 94 below the arcuate hold lip 90 and head section 102 of vial 94 above the arcuate hold lip 90.

FIG. 11 illustrates still another embodiment of a carrier according to the present invention. The carrier 110 of FIG. 11 has a first side periphery 112 which defines and provides a transport section 114 for orienting and conveying things to be transported. In this regard, a detent 116 of the first side periphery 112 is formed as an arcuate wall surface 118 to provide transport section 114. Arcuate wall surface 118 is designed to accommodate and receive a thing to be supported such as the body section 68 of vial 38 (illustrated at FIGS. 2 and 3) and to convey and orientate the same during assembly line process. Carrier 110 is similar to carrier 20 previously described with a couple of important distinctions. First, it has a single arcuate wall surface 118 in contradistinction to having a plurality of walls forming detent 42 of transport section 40 of first side periphery 28 of carrier 20. Second, carrier 110 has no notch hold lip 64 forming a border or overhang of the transport section 40 of first side periphery 28 as found in carrier 20.

Figure 13:
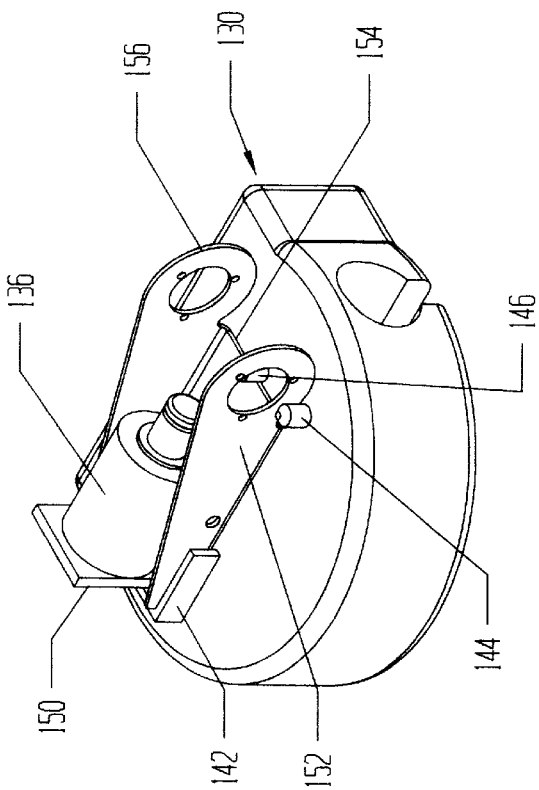
FIG. 13 is a perspective view of the carrier of FIG. 12 with the component part workpiece merged thereon.
Figure 12:
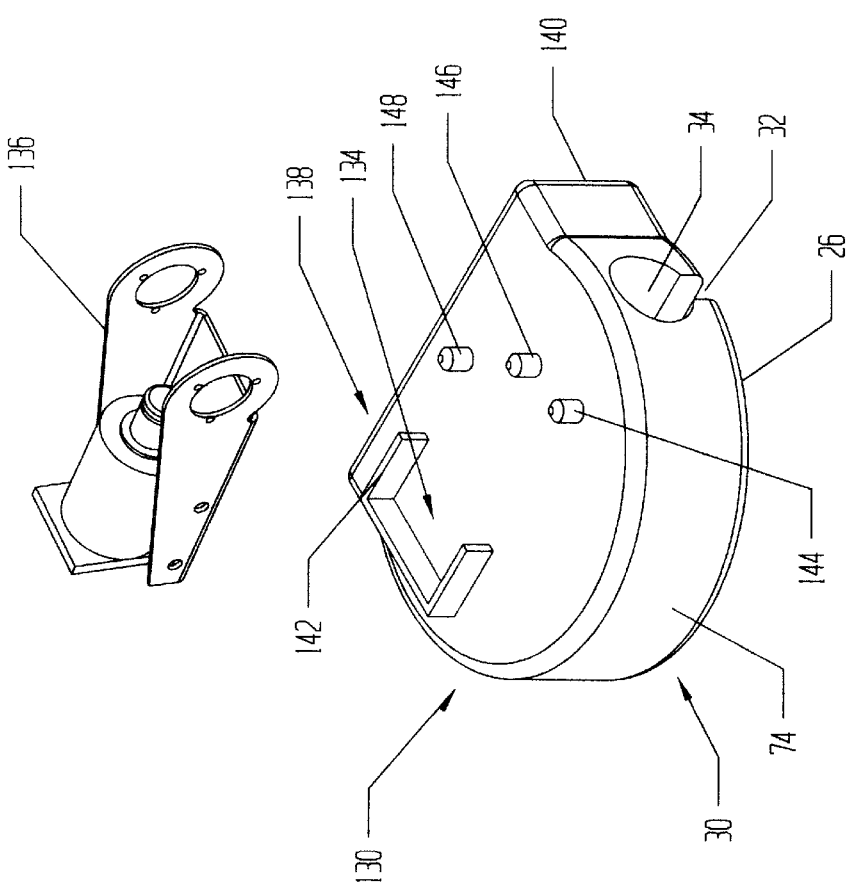
FIG. 12 is a perspective view of yet another embodiment of the carrier of the present invention having a top surface of the carrier body providing a transport section for a component part workpiece upwardly exploded therefrom.

FIGS. 12 and 13 illustrate yet another embodiment of a carrier according to the present invention. FIG. 12 is a perspective view of a carrier 130 of the present invention which has a top surface 132 that provides a transport section 134 for a component part workpiece 136 shown exploded upwardly therefrom. Thus, it is apparent that either the first side periphery or the top surface of a carrier of the present invention may define and provide a transport section for things to be merged with the carrier. Carrier 130 is similar to carriers 20, 80, and 110 in that all such carriers have a second side periphery 30 defining a drive control section 74 and a bottom surface 26 intersected by a traverse slot 32 which is upwardly communicative with traverse through bore 34. However, carrier 130 differs from the previously described carriers by having a transport section 134 upon top surface 132 while first side periphery 138 is comprised of substantially planar wall 140. Transport section 134 is comprised of a plurality of upward extensions to top surface 132, namely an upward extension brace 142, a first nub brace 144, a second nub brace 146, and a third nub brace 148. The plurality of upward extensions form a border adjacent at least a portion of the thing to be transported by and merge with carrier 130, namely component part workpiece 136. In FIG. 13, the component part workpiece 132 is shown seated and stabilized in transport section 134 upon top surface 132 of carrier 130 by virtue of upward extension brace 142 bordering and partially surrounding a rear section 150 of component part workpiece 136, a first nub brace 144 bordering immediately outside and adjacent to a first leg 152 of component part workpiece 136, a second nub brace 146 bordering immediately outside and adjacent to a front portion 154 of component part workpiece 136, and a third nub brace 148 bordering immediately outside and adjacent to a second leg 156 of component part workpiece 136. Variations of the transport section 134 to the top surface 132 of a carrier of the present invention which receives, supports, and stabilizes the thing to be transported upon the carrier are readily apparent depending on the nature of the thing to be supported. For example, one or more upward extensions of the top surface may be shaped as a male member to engage a female detent of the thing to be supported. Further variations of the number, placement location, and degree of upward extension may be made to accommodate the myriad potential products, things, and workpieces to merge with the carrier of the present invention. Alternatively, the top surface may have a detent formed therein, either arcuate or formed of a plurality of walls similar to exemplary detents of the first side periphery of carriers of the present invention previously described, which is dimensioned to receive, support, and stabilize the thing to be transported upon the carrier.

In all embodiments of the carrier of the present invention either the first side periphery or the top surface of the carrier defines and provides a transport section which is adapted to receive and convey a thing to be transported so that multiple surfaces, such a side, bottom, and top surface, of the thing is capable of being exposed to workstation or other carrier assembly line system processing by virtue of means for specifically orientating and rotating the carrier. In this regard, the present invention also provides for a drive means to move the carriers along a defined pathway having at least one guide element cooperative with the carriers and allowing for both linear motion of the carriers and rotation of the carriers on its horizontal axis in a direction perpendicular to its pathway travel.

Referring now to FIG. 1, there is shown an assembly carrier line system 10 in which carriers 12 are moved in a desired direction of travel d1,d2, in use, along a desired pathway p1,p2 to multiple work stations in order to perform work operations on products, things, or workpieces merged with the carriers. For purposes of clarity, the product, thing, or workpiece (such as vials 38) to be merged with the carriers 12 are not shown in FIG. 1.

The carriers 12 of the FIG. 1 assembly carrier line system 10 are as previously described herein, having a top surface 24, a bottom surface 26, a first side periphery 28 providing a transport section 40 adapted to receive and convey a thing to be transported, a second side periphery 30 providing a drive control section 74 adapted to engage a sprocket mechanism, a traverse slot 32, and a traverse through bore 34, the bottom Print head assembly 240 is operatively connected by cable 242 to printer 244 surface 26 being intersected by the traverse slot 32 and the traverse slot being upwardly communicative with the traverse through bore 34. Each carrier moves along the desired pathway p1,p2 by means of a guide element hereinafter discussed cooperative with the carriers and, in part, allowing linear movement of the carriers. A continuous supply of work pieces or things are provided to the carriers 12 by means of one or more feed transfer assemblies. For example, in FIG. 1 feeder assembly 66 comprises a feed conveyor belt 160 which conveyor feeds workpieces or things (not shown in FIG. 1), such as vial 36 previously discussed, in the direction c1 against barrier bar 162 for single line formation in channel 164 between barrier bar 162 and line formation wall 166. An in feed spin disk 168 rotatably in feeds the workpiece or thing to be transported for pick up by and placement upon the carriers such that the transport section 40 of the first side periphery 28 of each carrier receives the same in the matter previously described.

The assembly carrier line system 10 also includes a drive mechanism 170 (see FIG. 20) operative to annularly move a sprocket mechanism such, as sprocket wheels 172 and 174 each having a plurality of teeth 176 adapted to receive the drive control section 74 of the second side periphery 30 of carriers 12 between adjoining teeth. Thus, the loop formed by pathway p1,p2 and sprocket wheels 172 and 174 provides a contiguous supply of carriers such that movement of the sprocket wheels imparts carrier upon carrier lineal movement to the array of supplied carriers along pathway d1,d2.

Figure 14:
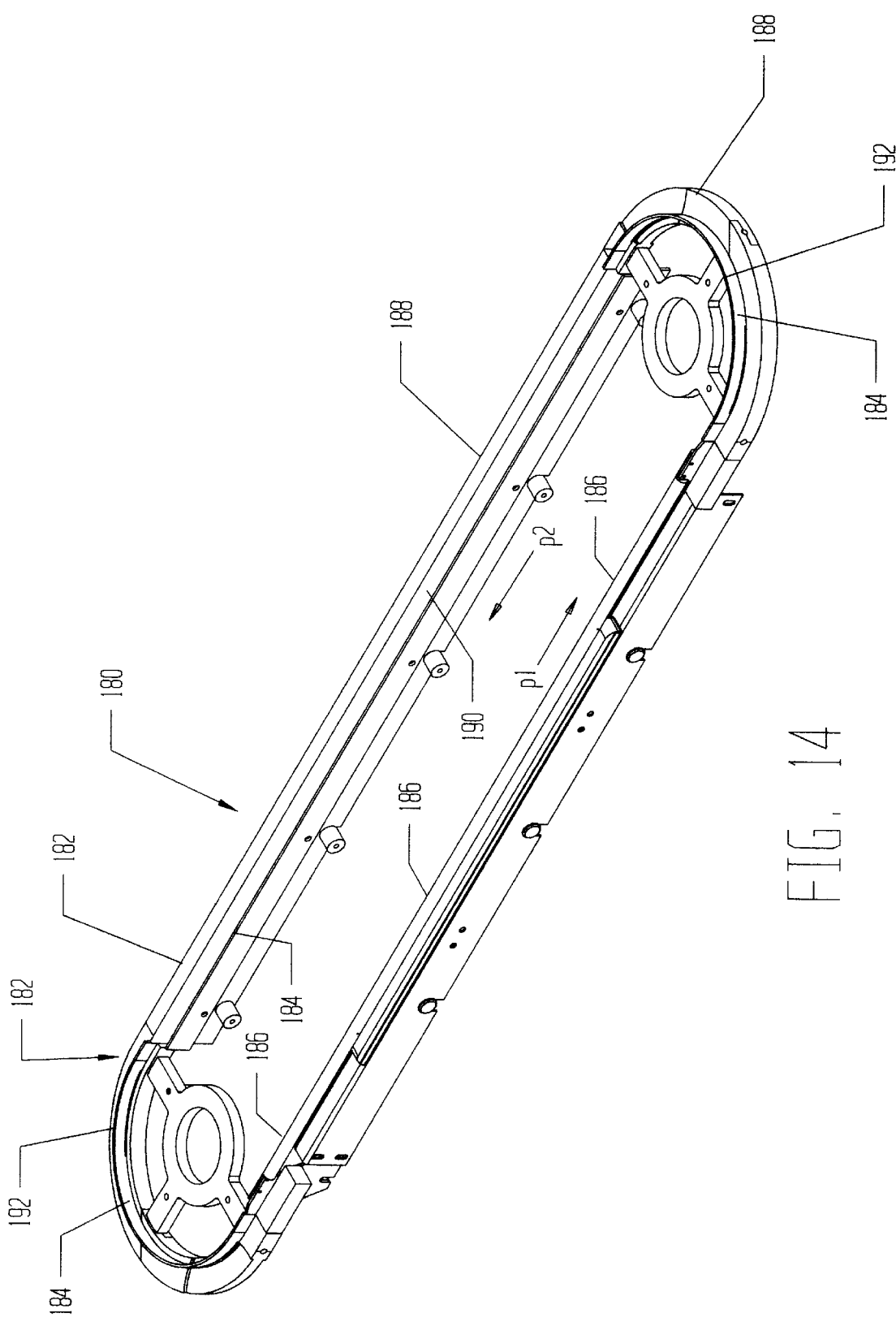
FIG. 14 is a top perspective view of an exemplary carrier pathway frame with the carriers and sprocket wheel drive means removed and shows the carrier guide elements of a rail, a guide rod, and a boundary barrier.

FIG. 14 is a top perspective view of an exemplary carrier pathway frame 180 with the carriers and sprocket wheel drive means removed for ease of illustration and discussion. In FIG. 14 track assembly 182 has a looped pathway p1,p2 which may, continuously or intermittently, employ or combine one or more of three distinct guide elements to allow for selected, precise, and controlled orientation and rotation of the carriers, namely a rail 184 dimensioned to engage the traverse slot 32 of carriers 12, 20, 80, 110, or 130, a rod 186 for engagement into the traverse through bore 34 of carriers 12, 20, 80, 110, or 130, or a boundary barrier 188 to channel and contain the carriers 12, 20, 80, 110, or 130. Rail 184 may be straight or acruate, such as straight rail section 190 or an acruate rail sections 192 at the loop pathway ends. When rail 184 is disposed within the traverse slot 32 of carriers 12, 20, 80, 110, or 130, the bottom surface 26 of such carriers is at a "base" position/orientation seated adjacent rail 184 and the drive means which move the carriers along the desired pathway p1,p2 provide linear motion of the carriers along the rail 184. Alternatively or cumulatively, a boundary barrier 188 to the desired pathway can be established to contain the carriers in the base seated position within the desired pathway. However when a rod 186 engages the traverse through bore 34 of carriers 12, 20, 80, 110, or 130, each carrier is free to potentially rotate along its horizontal axis circumferentially upon the rod 186 as well as to move in a lineal direction along the length of the rod. One or more of such guide elements may be utilized at any particular segment of a desired pathway depending upon the purpose and functions of the carrier assembly line system.

Figure 15:
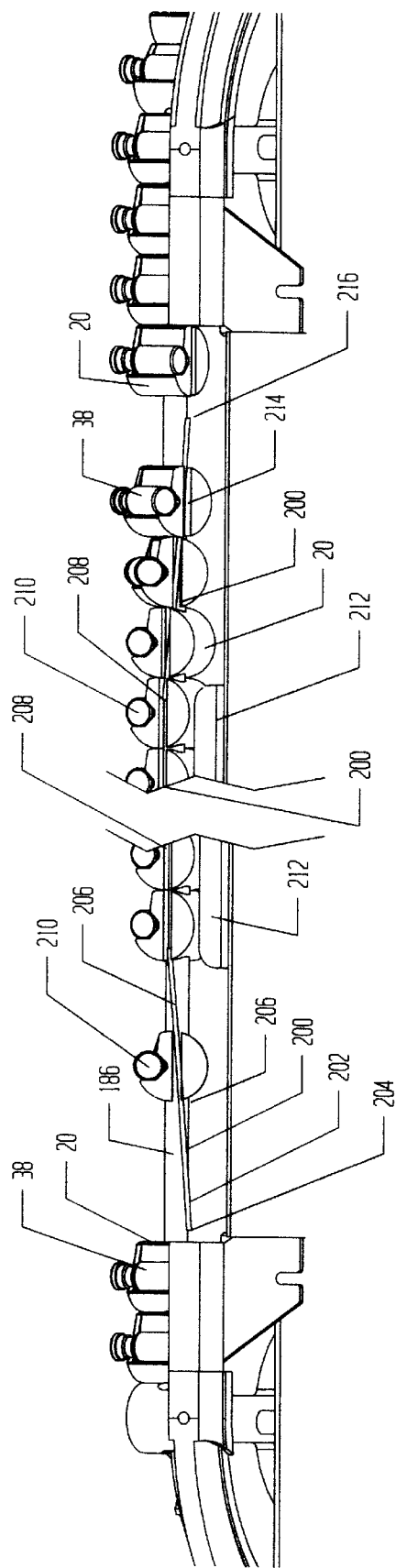
FIG. 15 is bottom perspective view of an exemplary section of a carrier pathway and shows the ride of a carrier upon a guide rod having a cam element which rotates said carrier on its horizontal axis circumferentially upon the rod perpendicular to its direction of travel along at least a portion of the length of the rod.

Indeed, carrier movement in a desired pathway with a controlled rotational orientation of the carriers along their horizontal axis perpendicular to the pathway may be achieved by employment of a rod having a cam rail thereon. As illustrated at the bottom view of FIG. 15, rod 186 is integral with an extended cam rail 200 upon the rod's external surface. The extended cam rail 200 has an initial engagement portion 202 extending downwardly from the bottom-most surface 204 of rod 200 which is suitable to engage the traverse slot 32 of carriers 12, 20, 80, 110, or 130 while the rod 186 engages the traverse through bore 34 of such carriers. At this particular position, carrier 20 illustrated at FIG. 15 is still at its "base" bottom surface seated position wherein the carrier is not yet rotated about its horizontal axis circumferentially upon rod 186. However, when carrier 20 moves along the initial engagement portion 202 of the cam rail 200 it necessarily moves forward in a linear stabilized direction. However, once the extended cam rail 200 begins to be circumferentially displaced and deviated from its initial engagement portion 202 position extending downwardly from the bottom-most surface 204 of rod 186 to a second displaced portion 206 of the cam rail 200, the carrier 20 necessarily rotates about its horizontal axis circumferentially upon the rod in a direction perpendicular to its ongoing linear motion in a precise controlled rotational orientation of the carrier such that vial 38 merged in the transport section 40 thereof is likewise rotated to a degree corresponding to the controlled degree of displacement of the second displaced portion 206 of the cam rail 200 from its original downwardly extending position 204 from rod 186. The greater the degree of circumferential displacement of the second displaced portion 206 of extended cam rail 200 from the first portion 204 of extended cam rail 200 disposed to be purely downwardly extending from rod 186, the greater is the degree of controlled rotation of the carrier and its merged workpiece perpendicular to its ongoing linear motion. A third stabilization portion 208 of the extended cam rail 200 maintains a selected desired degree of carrier rotation along a segment of the desired pathway p1,p2 suitable for work station interaction or desired function of an assembly carrier line system, for example in FIG. 15, the extended cam rail 200 rotates carrier 20 ninety (90) degrees such that workstation processing may be performed upon the bottom surface 210 of vial 38. Optionally, a slider bed 212 may be disposed under any of the pathway glide elements to at least partially support the movement of carriers along a selected segment of the desired pathway. Carriers 20 are then returned to their base bottom surface seated initial feed orientation in a cam rail manner reversing the rotation and orientation, namely, as observed in FIG. 15, by passage of the carrier on return displaced portion 214 of extended cam rail 200 to disengagement portion 216 of extended cam rail 200.

Figure 16:
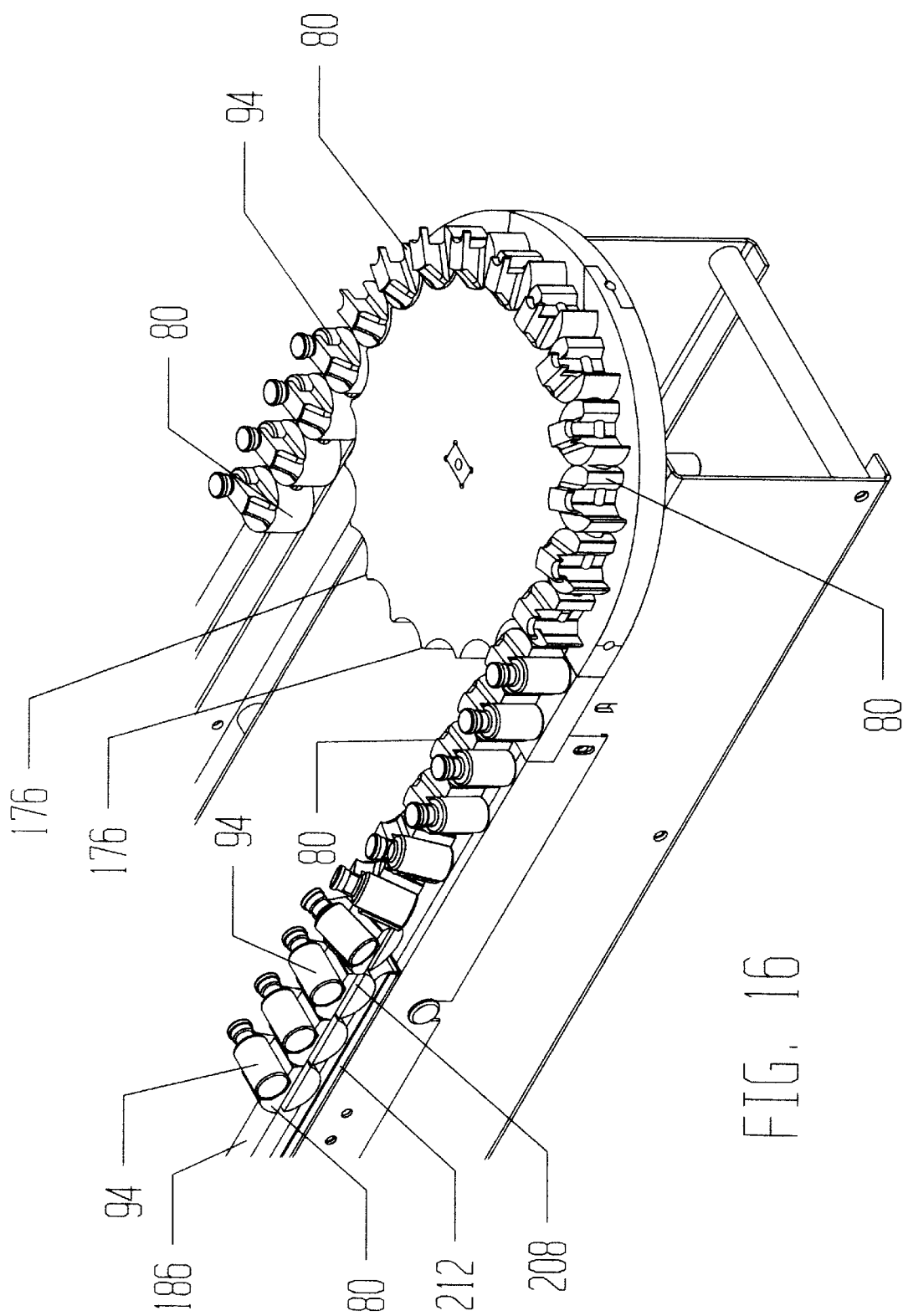
FIG. 16 is a top perspective view of a exemplary section of the carrier pathway showing the return orientation of a carrier after the rotation produced by the guide rod cam element.

FIG. 16 is a top perspective of an exemplary section of a a carrier pathway illustrating a return of alternative carrier 80 from a 90 degree rotated position wherein bottom surface 220 of alternative vial 94 is exposed for work station processing to the carrier's original "base" seated position via a reverse rotation produced by the guide rod cam element so that vial 94 may be discharge to a discharge assembly (similar to 230 of FIG. 1) and carrier 80 may be annularly circulated between a pair of teeth 176 of sprocket wheel 172 to receive a new vial 94 from a vial feed assembly (similar to 66 of FIG. 1).

In the exemplary carrier assembly line system 10 of FIG. 1, a controlled precise orientation and 90 degree rotation of carrier 12 illustrated therein occurs on a rod 186 of a first extended cam rail 234 as described above shortly after in feeding of a vial to the transport section 40 of carrier 12 from vial feed assembly 66 and release of the carrier 12 from sprocket wheel 172 so that a bottom surface of the vial is exposed to a first print head assembly 240 of a first workstation 16 for the spray printing of code, data, insignia, or other information upon the vial bottom surface. Print head assembly 240 is operatively connected by cable 242 to printer 244. A third stabilization portion 208 of the extended cam rail 200 maintains the orientation and 90 degree rotation of carrier 12 to a second workstation 18 where a print verification assembly 250 comprised of focal strobe light 252 and print verification vision sensor 254 verifies the successful transfer of first workstation 16 print to the bottom surface of the vial. In the event of non-verification, the subject vial can be later rejected by rejection assembly 260 (see also FIG. 19). After print verification processing by the second workstation 18, carriers 12 are returned to their initial feed base seated orientation in a reverse cam rail manner as previously described and illustrated such that drive control section 74 of the second side periphery 30 of carrier 12 engages a reception pocket 270 between a pair of teeth 176 of sprocket wheel 174 to be circled around to engage a second extended cam rail 274. The second extended cam rail 274 orientates and rotationally tilts carrier 12, and hence its merged workpiece vial, along its horizontal axis circumferentially upon rod 186 of second extended cam rail 274 in a direction perpendicular to the pathway p1 only thirty (30) degrees to thereby expose a cap of a vial to a second print head assembly 280 of a third workstation 15 for the spray printing of code, data, insignia, or other information upon the vial cap. Like print head assembly 240 of workstation 16, print head assembly 280 of workstation 15 is operatively connected by a cable 282 to printer 244. As previously noted, the controlled precise degree of rotation of carrier 12 to only a thirty (30) degree tilt for the third workstation 15 processing, in contradistinction to the 90 degrees of rotation required at first workstation 16 and second workstation 18, is achieved by the degree of cam rail displacement along the second extended cam rail 274. Thus, a displacement of a second displaced portion 206 of the second extended cam rail 274 thirty (30) degrees from the initial engagement portion 204 of the second extended cam rail 274 disposed downwardly extending from bottom-most surface 204 of rod 185 allows a third stabilization portion 206 of the second extended cam rail 274 to maintain the thirty (30) degree tilted carrier rotation/orientation along the third workstation 15 segment of the desired pathway.

After vial cap printing at workstation 15, a reversal of the cam rail returns carrier 12 to its "base" bottom surface seated or initial feed orientation for processing at fourth workstation 17 which requires exposure of a side surface of the product, thing, or workpiece (such as a vial) conveyed by the transport section 40 of the first side periphery 30 of the carrier 12. The fourth workstation 17 of FIG.1 accomplishes a label adhering function to a carrier conveyed vial and comprises a labeling assembly 290 wherein a stretched film of adhesive label 292 is pressed fitted against a side surface of the vial merged in carrier 12 by adhesion arm 294. First roller 296 spin the vial allowing for an adhesive press fitting of a label circumferentially upon the vial's side surface. Second roller 298 does the same as a duplicitous step to ensure label adhesion before vials are discharge from carriers 12 by discharge assembly 230. Discharge assembly 230 comprises a spin disk 308 which rotatably dislodges vials from the transport section 40 of first side periphery 28 of carrier 12 into barrier brace 302 for single line formation of multiple vials into channel 304 between barrier brace 302 and line formation wall 306. Discharge spin disk 308 discharges the workpiece or thing to be transported to channel 304 such that line formation of multiple vials spills the vials into conveyor belt 300 which moves the same in the direction c2 past block arm 310 for manual tray or other package loading at load area 310 or tray assembly area 312.

Figure 20:
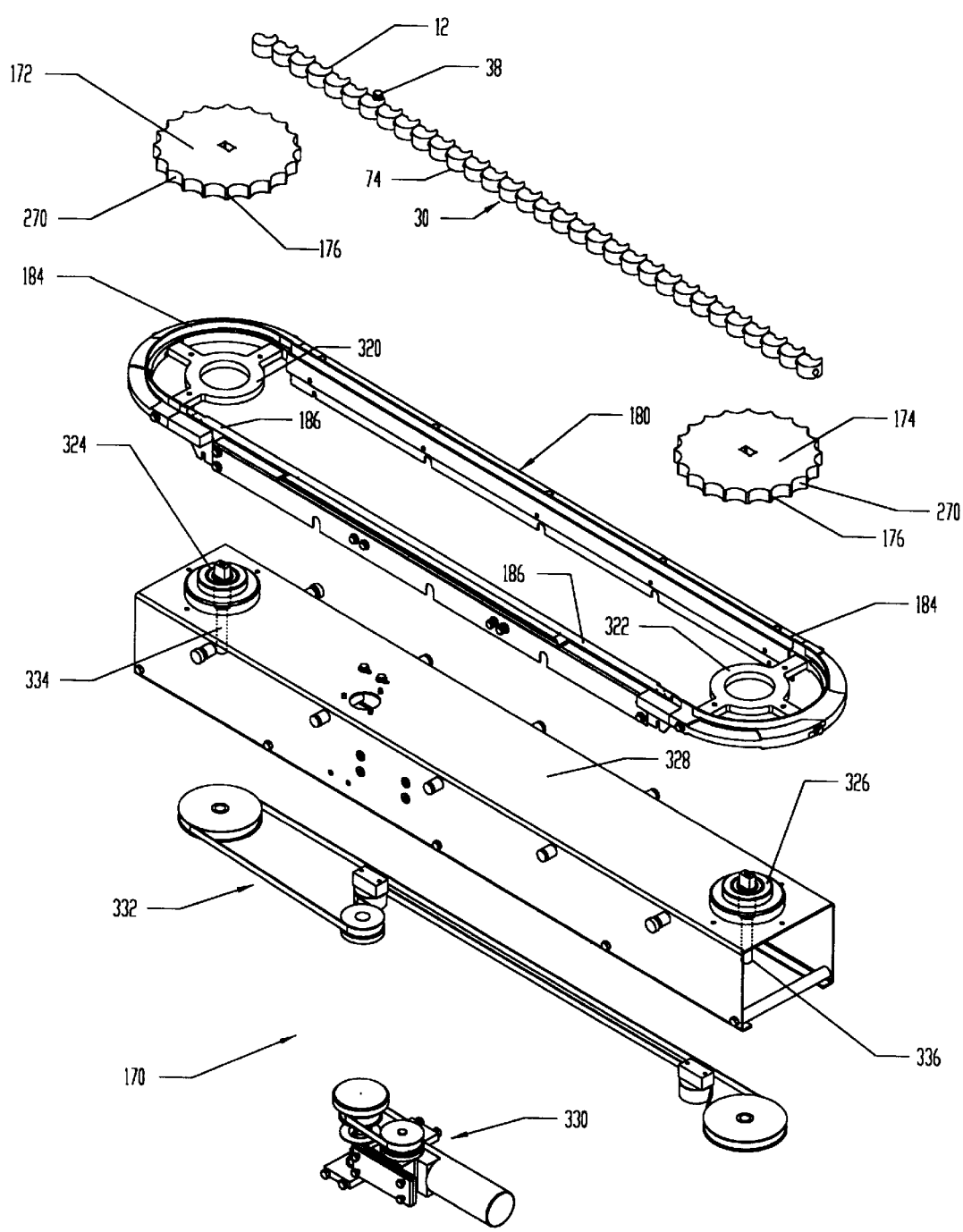
FIG. 20 is a schematic perspective view with components exploded of an exemplary drive means subassembly to power drive and rotate a pair of sprocket wheels.

Drive means for moving the carriers on a desired pathway may comprise at least one sprocket wheel operatively driven by a motor power source to provide linear motion to a plurality of the carriers. FIG. 20 is schematic perspective view of an exemplary drive means and shows drive mechanism 170 with the components thereof exploded from each other. Sprocket wheels 172 and 174 each have a plurality of sprocket teeth 176 at their outer annular periphery which are shaped to complementary receive the drive control section 74 of the second side periphery 30 of the carriers 12 within reception pocket 270 defined between a pair of teeth 176 of each sprocket wheel. Carrier pathway frame 180 is as previously described in association with FIG. 14 and further includes sprocket wheel basins 320 and 322 which receive sprocket wheels 172 and 174 respectively for operative connection to turn mechanisms 324 and 326 respectively when pathway frame 180 is mounted on base frame 328. Each sprocket wheel is turned by a power drive known in the applicable sprocket wheel art. For example, in FIG. 20 base frame 328 houses a motor and clutch assembly 330 operatively connected to a drive belt assembly 332 that engages spin axles 334 and 336 of turn mechanisms 324 and 326 respectively to thereby rotate sprocket wheels 172 and 174 respectively. Preferably, the drive mechanism 170 is responsive to a control panel or computer (see 340 at FIG. 17) for controlling the speed and direction of sprocket wheels 172 and 174. As the teeth 176 of sprocket wheels 172 and 174 turn annularly along a radius of the desired pathway of carrier travel, the teeth receive a drive control section 74 of a single carrier 12 to move the same within reception pocket 270 along the wheels radius for release from the sprocket wheel and return to the looped pathway.

Figure 17:
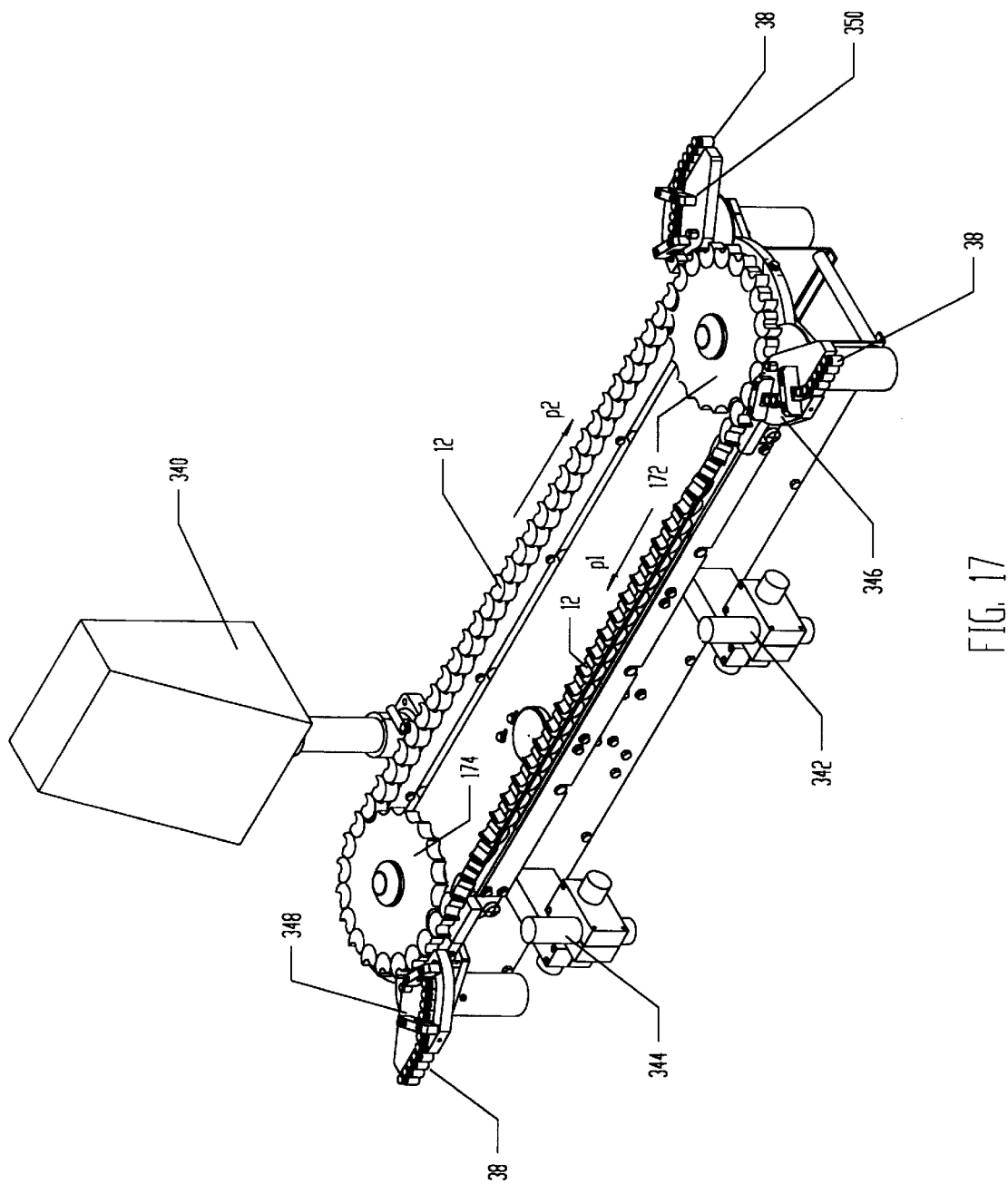
FIG. 17 is a top perspective schematic view of an assembly line system constructed in accordance with the teachings of present invention similar to FIG. 1 fully loaded with carriers conveyed in a desired direction of travel, in use, along an assembly line and shows workstation basin subassemblies and feed, discharge, and rejection assemblies for the things to be worked upon.

FIG. 17 is a top perspective schematic view of an assembly line system constructed in accordance with the teachings of present invention similar to FIG. 1 fully loaded with carriers 12 conveyed in a desired direction of travel, in use, along an assembly line. In FIG. 17, workstation basin sub-assemblies 342 and 344 respectively serve as mount bases for workstation apparatus such print head 240 of workstation 16 and print verification assembly 250 of workstation 18 respectively illustrated at FIG. 1. As observed in FIG. 17, motion of the carriers 12 along the loop pathway p1,p2 when the carriers are separated from the sprocket wheels 172 and 174 is achieved by a carrier against carrier force of a contiguous array of carriers filling the loop. In this regard, the sprocket wheels may be adjoined and complimented by transfer assemblies, such as workpiece in feed transfer assembly 346 which directs the flow of things to be transported, such as vials 38, for feeding to carriers 12 of sprocket wheel 172, workpiece rejection assembly 348, and workpiece discharge assembly 350.

In FIG. 18 sprocket wheel 172 of one end of the assembly line system of FIG. 17 has its associated carriers and feed and discharge assemblies removed to thereby better show two spin disks, namely a spin disk 360 for the feeding of things to the carriers cooperative with in feed transfer assembly 346 and a spin disk 362 for the discharge of things from their carriers cooperative with workpiece discharge assembly 350 after a completion of a carrier loop. In FIG. 19 sprocket wheel 174 of the other end of the assembly line system of FIG. 17 likewise has its associated carriers and rejection assembly removed to thereby better shows a spin disk 364 for the rejection of things from their carriers that is cooperative with workpiece rejection assembly 348. In the case of workpiece rejection, spin disk 364 is operatively responsive to a rejection signal generated by workstation processing. For example, in FIG. 1 print verification assembly 250 of workstation 18 may generate a signal to operate rejection assembly 260.

Supplemental apparatus suited for the desired purposes and functions of an assembly line carrier system, and in particular the process workstation thereof, may also be employed such as, for sample in FIG. 1, printer 244, drive mechanism control panel 370, computer monitor 372, and enclosure casing 374 which houses computer processing units, program logic controllers, power supplies, and/or applied electronic or mechanical controls associated with process workstation or assembly line functions.

In addition to the carrier, the means for specifically orientating and conveying things in a desired direction of travel, and the assembly carrier line system, the present invention embraces a process for specifically orientating and conveying things in a desired direction of travel. By providing a plurality of carriers as heretofore described upon a desired pathway and moving the carriers by means of a sprocket mechanism operatively connected to a drive mechanism along one or more of the guide elements of the pathway as heretofore described, process advantages, benefits, and superiority of the present invention can be achieved. A process of specifically orienting and conveying things in a desired direction of travel comprising the steps of (a) providing a plurality of carriers upon an assembly line pathway, each of the carriers comprising a body having a top surface, a bottom surface, a first side periphery, a second side periphery, a traverse slot, and a traverse through bore, the bottom surface being intersected by the traverse slot, the traverse slot being upwardly communicative with the traverse through bore, the first side periphery or the top surface providing a transport section adapted to receive and convey the thing to be transported, and the second side periphery providing a drive control section suited to engage a sprocket mechanism operatively connected to a drive mechanism, and (b) moving the carriers along the pathway by means of a sprocket mechanism operatively connected to a drive mechanism, the pathway having a guide element cooperative with the carriers, the pathway guide element being selected from one or more of the group consisting of a rail for engagement into the traverse slot of the carrier, a rod for engagement into the traverse through bore of the carrier, and a boundary barrier to contain said carriers. Additional process steps can include (c) mounting of the traverse through bore of the carriers upon the rod with the rod having a cam element thereon and (d) contacting the traverse slot of said carrier with the cam element to rotate said carrier on its horizontal axis circumferentially upon the rod in a direction perpendicular to its direction of travel along at least a potion of the length of the rod. Further process steps may include (e) feeding a thing or workpiece to the transport section of the carrier first side periphery or top surface or discharging or rejecting the same from the transport section of the carrier first side periphery or top surface by means of a transfer assembly.

The sprocket mechanism for the process of specifically orienting and conveying things in a desired direction of travel may comprise a sprocket wheel having a plurality of teeth and the step of moving said carriers along the pathway may include receiving the drive control section of the carriers between the teeth along a radius of the pathway.

From the foregoing description, it will be apparent that the carrier, carrier orientation structure, carrier line system, and carrier process of the present invention has a number of advantages, some of which have been described above and others of which are inherent in the invention. Also, it will be understood that modifications can be made to the carrier, carrier orientation structure, carrier line system, and carrier process of the present invention or its environment of use described above without departing from the teachings of the present invention. For example, the sprocket mechanism which engages the drive control section of the second side periphery of the carrier need not be limited to a reception pocket defined by teeth of a sprocket wheel engaging a defined mass profile of the carrier. The drive control section could consists, for example, of a wall aperture or slot that engages a sprocket arm or gear. Further, it is readily apparent that the present invention is useful in many process environments, the workstation process applications are arbitrary, and the associated process or workstation apparatus can greatly vary depending upon the carrier line system purposes and functions. Still further, movement of the carriers is not limited to carrier against carrier force movement as segments of a desired pathway could employ gravity motion, belt or mechanical motion, or chain or other supplementary drive means. Accordingly, the scope of the invention is only to be limited as necessitated by the accompanying claims.

I claim:

1. A carrier for orienting and conveying things to be transported comprising a body having a top surface, a bottom surface, a first side periphery, a second side periphery, a traverse slot, and a traverse through bore, said bottom surface being intersected by said traverse slot, said traverse slot being upwardly communicative with said traverse through bore, said first side periphery or said top surface providing a transport section adapted to receive and convey said thing to be transported, and said second side periphery providing a drive control section suited to engage a drive mechanism.

2. A carrier for orienting and conveying things to be transported according to claim 1 wherein said traverse through bore is substantially arcuate in cross-section and extends substantially parallel to said desired direction of travel of said carrier when said carrier is properly oriented.

3. A carrier for orienting and conveying things to be transported according to claim 1 wherein said first side periphery providing a transport section is spaced a given distance from and separated from said traverse slot and is capable of exposing a side surface and bottom surface of said thing to be transported.

4. A carrier for orienting and conveying things to be transported according to claim 1 wherein said first side periphery or said top surface providing a transport section comprises a detent formed in said body.

5. A carrier for orienting and conveying things to be transported according to claim 4 wherein said detent is arcuate.

6. A carrier for orienting and conveying things to be transported according to claim 4 wherein said detent is formed of a plurality of walls.

7. A carrier for orienting and conveying things to be transported according to claim 1 wherein said second side periphery providing a drive control section comprises a profile suited to engage a reception pocket defined between teeth of a sprocket wheel.

8. A carrier for orienting and conveying things to be transported according to claim 1 further including means cooperative with said first side periphery or said top surface to merge the thing to be transported with said carrier.

9. A carrier for orienting and conveying things to be transported according to claim 8 wherein said means to merge said carrier with said thing to be transported comprises a hold lip forming a border or overhang of said first side periphery to engage at least a portion of said thing to be transported.

10. A carrier for orienting and conveying things to be transported according to claim 8 wherein said means to merge said carrier with said thing to be transported comprises at least one upward extension of said top surface to form a border adjacent at least a portion of said thing to be transported.

11. Means for specifically orienting and conveying things in a desired direction of travel said means comprising a carrier for orienting and conveying things to be transported, a pathway having a guide element cooperative with said carrier, and drive means for moving said carrier along said pathway, said carrier comprising a body having a top surface, a bottom surface, a first side periphery, a second side periphery, a traverse slot, and a traverse through bore, said bottom surface being intersected by said traverse slot, said traverse slot being upwardly communicative with said traverse through bore, said first side periphery or said top surface providing a transport section adapted to receive and convey said thing to be transported, and said second side periphery providing a drive control section suited to cooperate with said drive means, said pathway guide element being selected from one or more of the group consisting of a rail for engagement into said traverse slot of said carrier, and a rod for engagement into said traverse through bore of said carrier, and a boundary barrier to contain said carrier.

12. Means for specifically orienting and conveying things in a desired direction of travel according to claim 11 further comprising a slider bed under said pathway for at least partially supporting the movement of said carrier along said pathway.

13. Means for specifically orienting and conveying things in a desired direction of travel according to claim 11 wherein said drive means for moving said carrier along said pathway comprises at least one sprocket wheel operative by a drive mechanism to provide motion to a plurality of said carriers.

14. Means for specifically orienting and conveying things in a desired direction of travel according to claim 13 wherein said drive means for moving said carriers along said pathway comprises a plurality of sprocket wheels operative by a drive mechanism to provide a loop motion to a plurality of said carriers.

15. Means for specifically orienting and conveying things in a desired direction of travel according to claim 11 wherein said pathway has a radius.

16. Means for specifically orienting and conveying things in a desired direction of travel according to claim 11 wherein said carrier further includes means cooperative with the first side periphery or said top surface to merge the thing to be transported with said carrier.

17. Means for specifically orienting and conveying things in a desired direction of travel according to claim 16 wherein said means to merge said carrier with said thing to be transported comprises a hold lip forming a border or overhang of said first side periphery to engage at least a portion of said thing to be transported.

18. A carrier for orienting and conveying things to be transported according to claim 15 wherein said means to merge said carrier with said thing to be transported comprises at least one upward extension of said top surface to form a border adjacent at least a portion of said thing to be transported.

19. Means for specifically orienting and conveying things in a desired direction of travel according to claim 11 wherein said rod for engaging the through bore of said carrier includes a cam element to make contact with said traverse slot of said carrier and to rotate said carrier on its horizontal axis circumferentially upon said rod in a direction perpendicular to its direction of travel along at least a portion of the length of the rod.

20. An assembly carrier line system in which carriers are conveyed in a desired direction of travel, in use, along an assembly line to work stations in order to perform work operations on things merged with said carriers, comprising:

a pathway, a drive mechanism, a plurality of carriers, each of said carriers comprising a body having a top surface, a bottom surface, a first side periphery, a second side periphery, a traverse slot, and a traverse through bore, said bottom surface being intersected by said traverse slot, said traverse slot being upwardly communicative with said traverse through bore, said first side periphery or said top surface providing a transport section adapted to receive and convey said thing to be transported, and said second side periphery providing a drive control section, a sprocket mechanism responsive to said drive mechanism cooperative with said drive control section of said carriers to cause movement of said carriers upon said pathway, said pathway having a guide element cooperative with said carriers, said pathway guide element being selected from one or more of the group consisting of a rail for engagement into said traverse slot of said carriers, a rod for engagement into said traverse through bore of said carriers, and a boundary barrier to contain said carriers.

21. An assembly carrier line system according to claim 20 further including a transfer assembly directing the flow of things to be transported for the feeding, or discharge, or rejection of things to be transported upon said carriers.

22. An assembly carrier line system according to claim 21 wherein said transfer assembly includes a spin disk cooperative with a line formation of things to be transported for the feeding, or discharge, or rejection of the things to be transported upon said carriers.

23. An assembly carrier line system according to claim 20 wherein said sprocket mechanism is a sprocket wheel having a plurality of teeth to guide said carriers therebetween along a radius of said pathway.

24. An assembly carrier line system according to claim 20 wherein said rod for engaging the through bore of said carrier includes a cam element to make contact with said traverse slot of said carrier and to rotate said carrier on its horizontal axis circumferentially upon said rod in a direction perpendicular to its direction of travel along at least a portion of the length of the rod.

25. An assembly carrier line system according to claim 20 wherein said carriers further include means cooperative with the first side periphery or said top surface to merge the thing to be transported with said carrier.

26. An assembly carrier line system according to claim 25 wherein said means to merge said carrier with said thing to be transported comprises a hold lip forming a border or overhang of said first side periphery to engage at least a portion of said thing to be transported.

27. An assembly carrier line system according to claim 25 wherein said means to merge said carrier with said thing to be transported comprises at least one upward extension of said top surface to form a border adjacent at least a portion of said thing to be transported.

28. A process of specifically orienting and conveying things in a desired direction of travel, comprising the steps of providing a plurality of carriers upon an assembly line pathway, each of said carriers comprising a body having a top surface, a bottom surface, a first side periphery, a second side periphery, a traverse slot, and a traverse through bore, said bottom surface being intersected by said traverse slot, said traverse slot being upwardly communicative with said traverse through bore, said first side periphery or said top surface providing a transport section adapted to receive and convey said thing to be transported, and said second side periphery providing a drive control section suited to engage a sprocket mechanism operatively connected to a drive mechanism, and moving said carriers along said pathway by means of said sprocket mechanism operatively connected to said drive mechanism, said pathway having a guide element cooperative with said carriers, said pathway guide element being selected from one or more of the group consisting of a rail for engagement into said traverse slot of said carrier, a rod for engagement into said traverse through bore of said carrier, and a boundary barrier to contain said carriers.

29. A process of specifically orienting and conveying things in a desired direction of travel according to claim 28, further comprising the steps of mounting of said traverse through bore of said carriers upon said rod, said rod having a cam element thereon, and contacting said traverse slot of said carrier with said cam element to rotate said carrier on its horizontal axis circumferentially upon said rod in a direction perpendicular to its direction of travel along at least a portion of the length of the rod.

30. A process of specifically orienting and conveying things in a desired direction of travel according to claim 28 wherein said sprocket mechanism comprises a sprocket wheel having a plurality of teeth and the step of moving said carriers along said pathway includes receiving said drive control section of said carriers between said teeth along a radius of said pathway.

31. A process of specifically orienting and conveying things in a desired direction of travel according to claim 28 further including the step of feeding a thing to said transport section of said carrier first side periphery or said top surface or discharging or rejecting said thing from said transport section of said carrier first side periphery or said top surface by means of a transfer assembly.

* * * * *